un012267758B2

(12) United States Patent
Leijon et al.

(10) Patent No.: US 12,267,758 B2
(45) Date of Patent: Apr. 1, 2025

(54) CROSS-DOMAIN ORCHESTRATION THROUGH BOUNDARY CONDITIONS

(71) Applicant: Cisco Technology, Inc., San Jose, CA (US)

(72) Inventors: Viktor Mats Emanuel Leijon, San Jose, CA (US); John Joseph Mullooly, Colts Neck, NJ (US); Roger Fredrik Jansson, Saltsjöbaden (SE)

(73) Assignee: CISCO TECHNOLOGY, INC., San Jose, CA (US)

( * ) Notice: Subject to any disclaimer, the term of this patent is extended or adjusted under 35 U.S.C. 154(b) by 568 days.

(21) Appl. No.: 17/704,382

(22) Filed: Mar. 25, 2022

(65) Prior Publication Data

US 2023/0308845 A1 Sep. 28, 2023

(51) Int. Cl.
| | |
|---|---|
| H04W 4/50 | (2018.01) |
| H04W 8/22 | (2009.01) |
| H04W 8/26 | (2009.01) |
| H04W 24/02 | (2009.01) |

(52) U.S. Cl.
CPC ............... *H04W 4/50* (2018.02); *H04W 8/22* (2013.01); *H04W 8/26* (2013.01); *H04W 24/02* (2013.01)

(58) Field of Classification Search
CPC ........... H04W 4/50; H04W 8/22; H04W 8/26; H04W 24/02
USPC ......................................................... 370/329
See application file for complete search history.

(56) References Cited

U.S. PATENT DOCUMENTS

| | | | | | |
|---|---|---|---|---|---|
| 12,009,964 | B2* | 6/2024 | Gerö | ................... | G06F 16/2255 |
| 2012/0278430 | A1* | 11/2012 | Lehane | ............... | H04L 41/5054 |
| | | | | | 709/217 |
| 2016/0366716 | A1* | 12/2016 | Bhalla | .................... | H04W 4/70 |
| 2017/0090994 | A1 | 3/2017 | Jubinski et al. | | |
| 2017/0289172 | A1* | 10/2017 | Turakhia | ............... | H04L 63/062 |
| 2017/0302474 | A1 | 10/2017 | Li et al. | | |

(Continued)

OTHER PUBLICATIONS

Weiqiang Cheng, et al., "Framework and Architecture for the Application of SDN to Carrier networks," Open Networking Foundation, ONF TR-534, Version 1.0, Jul. 18, 2016, 40 pages.

(Continued)

*Primary Examiner* — Mark G. Pannell
(74) *Attorney, Agent, or Firm* — Edell, Shapiro & Finnan, LLC

(57) ABSTRACT

Presented herein are techniques to automatically provision cross-domain end-to-end services. A method includes receiving, at a cross-domain orchestrator, a request for a service, decomposing the request for the service into a first provisioning command and into a second provisioning command, sending the first and second provisioning commands to the first and second domains, respectively, receiving, from the first domain, in response to the first provisioning command, a first constraint associated with the first resource of the first domain, receiving, from the second domain, in response to the second provisioning command, a second constraint associated with the second resource of the second domain, distributing the first constraint to the second domain, and the second constraint to the first domain; and initiating, based on the first and second constraints, the service using the first resource of the first domain and the second resource of the second domain.

20 Claims, 5 Drawing Sheets

(56) References Cited

U.S. PATENT DOCUMENTS

| | | | |
|---|---|---|---|
| 2019/0014117 A1* | 1/2019 | Li | H04L 67/14 |
| 2019/0313167 A1 | 10/2019 | Lee et al. | |
| 2021/0234898 A1 | 7/2021 | Desai et al. | |
| 2022/0224630 A1* | 7/2022 | Gerö | H04L 45/04 |
| 2023/0333880 A1* | 10/2023 | White | G06F 9/4881 |

OTHER PUBLICATIONS

Carlos J. Bernardos, et al., "5GEx: Realizing a Europe wide Multi-domain Framework for Software Defined Infrastructures," Transactions On Emerging Telecommunications Technologies, Version: Jun. 19, 2012 v2.10, Jun. 2016, 9 pages.

Mouhamad Dieye, et al., "Market Driven Multidomain Network Service Orchestration in 5G Networks," IEEE Journal On Selected Areas in Communications, vol. 38, No. 7, Jul. 2020, 15 pages.

R. Guerzoni, et al., "Multi-domain Orchestration and Management of Software Defined Infrastructures: a Bottom-Up Approach," Core, 2016, 6 pages.

"5GEx: 5G Exchange," 5G PPP, https://5g-ppp.eu/5gex/, Jan. 10, 2015, 3 pages.

Luis M. Contreras, et al., "Network Management and Orchestration," 5G System Design Book, Chapter 10, 2018, 35 pages.

Pascal Hitzler, et al., "OWL 2 Web Ontology Language Primer," W3C Recommendation, Second edition, https://www.w3.org/TR/2012/REC-owl2-primer-20121211/, Dec. 11, 2012, 65 pages.

Peter O'Hearn, "Separation Logic," Communications of the ACM, vol. 62, No. 2., Feb. 2019, 10 pages.

R. Enns, et al., "Network Configuration Protocol (NETCONF)," Internet Engineering Task Force (IETF), Request for Comments: 6241, Obsoletes: 4741, Category: Standards Track, Jun. 2011, 113 pages.

M. Bjorklund, et al., "YANG—A Data Modeling Language for the Network Configuration Protocol (NETCONF)," Internet Engineering Task Force (IETF), Request for Comments: 6020, Category: Standards Track, Oct. 2010, 173 pages.

* cited by examiner

CROSS-DOMAIN ORCHESTRATION THROUGH BOUNDARY CONDITIONS

TECHNICAL FIELD

The present disclosure relates to automatically provisioning end-to-end services across different technology domains.

BACKGROUND

End-to-end (E2E) services are increasingly moving from implementation exclusively within a single domain to implementation across multiple domains. That is, new E2E services are being introduced that require the configuration of diverse technology elements across different technology domains to fulfill customer requirements. For example, some E2E services rely on both the Data Center (DC) domain and the Internet Protocol (IP) Transport domain, or both the 5G-core domain and the 5G-Radio Access Network (RAN) domain, or both the Optical domain and the IP routing domain. While these examples suggest only two disparate domains may be employed, three, four or more domains may be necessary to establish a desired end-to-end service.

Integration is a large part of the implementation effort for cross-domain service automation, and it is a challenge to stay relatively modular and dynamic with respect to new functionality. For example, one cross-domain problem is integrating multiple controllers, possibly from different vendors. Indeed, for larger customers, it is not uncommon that the set of controllers is unique for each new deployment, driving the cost of integration.

The presence of such a unique set of controllers (or other components or nodes) in each domain makes it difficult to automate cross-domain E2E services. That is, any automation to stand up a cross-domain E2E service necessitates a customized development effort to engineer and to optimize the desired integration between domains. This complexity drives up costs and extends implementation timelines.

DESCRIPTION OF EXAMPLE EMBODIMENTS

Overview

Figure 1:
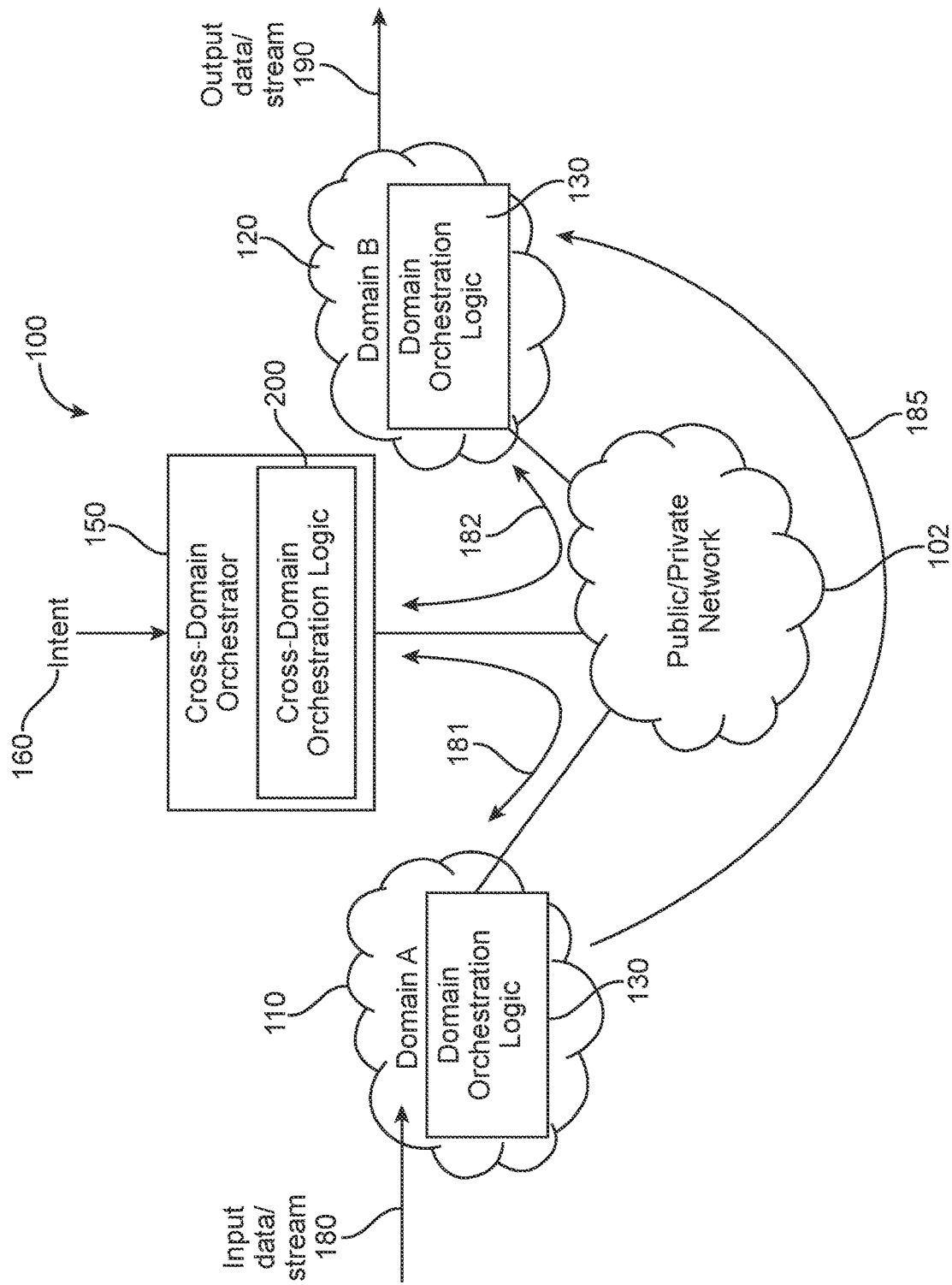
FIG. 1 depicts a topology, including a cross-domain orchestrator, which enables an end-to-end service to be automatically provisioned between two domains, according to an example embodiment.

Presented herein are techniques to establish or provision end-to-end services across domains using a cross-domain orchestrator. A method includes receiving, at a cross-domain orchestrator, a request for a service, determining that the service requires a first resource of a first domain and a second resource of a second domain, decomposing the request for the service into a first provisioning command and into a second provisioning command, sending the first provisioning command to the first domain, sending the second provisioning command to the second domain, receiving, from the first domain, in response to the first provisioning command, a first constraint associated with the first resource of the first domain, receiving, from the second domain, in response to the second provisioning command, a second constraint associated with the second resource of the second domain, distributing the first constraint to the second domain, and the second constraint to the first domain; and initiating, based on the first constraint and the second constraint, the service using the first resource of the first domain and the second resource of the second domain.

In another embodiment, a device is provided. The device includes an interface configured to enable network communications, a memory, and one or more processors coupled to the interface and the memory, and configured to: receive, at a cross-domain orchestrator, a request for a service, determine that the service requires a first resource of a first domain and a second resource of a second domain, decompose the request for the service into a first provisioning command and into a second provisioning command, send the first provisioning command to the first domain, send the second provisioning command to the second domain, receive, from the first domain, in response to the first provisioning command, a first constraint associated with the first resource of the first domain, receive, from the second domain, in response to the second provisioning command, a second constraint associated with the second resource of the second domain, distribute the first constraint to the second domain, and the second constraint to the first domain, and initiate, based on the first constraint and the second constraint, the service using the first resource of the first domain consistent with the first constraint and the second resource of the second domain consistent with the second constraint.

In still another embodiment, a non-transitory tangible computer readable storage media encoded with instructions that, when executed by at least one processor, is configured to cause the at least one processor to: receive, at a cross-domain orchestrator, a request for a service, determine that the service requires a first resource of a first domain and a second resource of a second domain, decompose the request for the service into a first provisioning command and into a second provisioning command, send the first provisioning command to the first domain, send the second provisioning command to the second domain, receive, from the first domain, in response to the first provisioning command, a first constraint associated with the first resource of the first domain, receive, from the second domain, in response to the second provisioning command, a second constraint associated with the second resource of the second domain, distribute the first constraint to the second domain, and the second constraint to the first domain, and initiate, based on the first constraint and the second constraint, the service using the first resource of the first domain consistent with the first constraint and the second resource of the second domain consistent with the second constraint.

Example Embodiments

Embodiments described herein provide an approach to achieve cross-domain end-to-end services in an automated and optimized fashion. A key to efficient system-wide optimization is to decompose a service "intent" into smaller pieces, and rely on local (domain-level) reasoning to be globally sound. Network automation problems have an advantage over many other kinds of problems in that networks have well-defined boundaries controlled by equally well-defined protocols. To tackle the complexity of multi-domain automation, the embodiments described herein provide a top-level, or cross-domain, orchestrator that breaks down or decomposes a top-level intent, or a request for service, into domain-level intents or pieces, in the form of provisioning commands, understands the boundary conditions that each domain presents, and delegates local optimization to each domain orchestrator. The top-level orchestrator's holistic view allows it to make global optimizations.

The embodiments described herein should be contrasted with manually programming the understanding of the domains and the boundaries, and may be understood as a mechanism that can be employed by a multi-domain orchestrator to simplify development and integration. Introducing a generic mechanism of boundary conditions makes it easier to add new conditions as new domains are introduced, or existing domains evolve, by, for instance, providing a flexible architecture for evolving the 5G slice automation.

Reference is now made to the figures beginning with FIG. 1, which depicts a topology of an orchestration system 100, including a cross-domain orchestrator that enables an end-to-end service to be automatically provisioned or established between two domains, according to an example embodiment. As shown, a network 102 interconnects Domain A 110 with Domain B 120. Network 102 may be a public or private network, including, but not limited to, e.g., the Internet, a local area network, wide area network, etc. Domain A 110 and Domain 120 may be any one of, e.g., a telecommunications network (e.g., 5G core or radio network), data center, IP transport service, etc.

FIG. 1 further shows that each of Domain A 110 and Domain B 120 includes domain orchestration logic 130. Domain orchestration logic 130 interacts with cross-domain orchestration logic 200 that is hosted by cross-domain orchestrator 150. Domain orchestration logic 130 and cross-domain orchestration logic 200 may be executed on a computing device like that shown in FIG. 5, and described later therein. As shown at a high level, cross-domain orchestration logic 200 receives a service "intent" 160 for, e.g., an end-to-end service that relies on the services provided independently by both Domain A 110 and Domain B 120. Cross-domain orchestration logic 200 breaks down the intent into smaller pieces and sends those pieces in the form of provisioning commands to the respective instances of domain orchestration logic 130 executing in Domain A 110 and Domain B 120.

The respective instances of domain orchestration logic 130, as will be explained in more detail below, assert, declare, request, accept, inform, and/or generate values associated with individual resources, boundaries, or boundary conditions associated with, or of, such resources, that pertain to the smaller pieces of service intent 160 supplied by cross-domain orchestration logic 200 and that are employed to establish aspects of the end-to-end service described by the pieces of the intent. After cross-domain orchestration logic 200 interacts with both instances of domain orchestration logic 130 at each of Domain A 110 and Domain B 120 as indicated by arrows 181, 182, and helps to exchange and/or to help negotiate boundaries, resource values, etc., between Domain A 110 and Domain B 120, the end-to-end service represented by service intent 160 may be fully established and instantiated, as indicated by arrow 185. In this regard, and as an example, an input data stream 180 may be passed through Domain A 110, processed therein as appropriate, and then passed to Domain B 120, and further processed therein as appropriate, such that a desired output data stream 190 is output from Domain B 120.

Stated alternatively, the embodiments described here provide two main components that interact with one another. The first component is a top-level orchestrator (e.g., cross-domain orchestrator 150 and/or cross-domain orchestration logic 200) that is configured to be aware of the nature of domains (e.g., Domain A 110 and Domain B 120) and to understand and communicate via a shared ontology for orchestration. For example, cross-domain orchestration logic 200 is configured to coordinate the boundaries (and values thereof) of the domains. That is, cross-domain orchestration logic 200 is configured to translate service intent 160 into domain-specific intents, act as a "relay agent" for boundary condition negotiation between the domains, and further also to control a high-level feedback loop that is used to solve or resolve constraints (e.g., resources and associated values) to establish the desired end-to-end service.

The second component comprises domain orchestrators (e.g., respective instances of domain orchestration logic 130 at Domain A 110 and at Domain B 120) that are intent-based and maintain the boundary conditions and perform optimization inside their respective domains.

More specifically, cross-domain orchestration logic 200 receives a top-level intent or request for a service. The top-level intent is broken down into domain-specific intents and initial values. Not all boundaries (or values) are necessarily fixed at this stage. Indeed, many boundaries (and/or values) are not known to cross-domain orchestration logic 200. In an embodiment, each domain (e.g., Domain A 110, Domain B 120) is activated with the intent, or pieces thereof, defined by a service model, and current known boundary values.

Each instance of domain orchestration logic 130 starts executing on the pieces of intent and determines the requirements for the boundaries. Some domains may not be able to start activation, while some can. The activation, in turn, generates additional boundary conditions. The result of activation is returned to cross-domain orchestration logic 200. Cross-domain orchestration logic 200 maps the results between domains, further resolving the boundary conditions and refining the values.

The operations related to activating with the pieces of intent and communicating back to cross-domain orchestration logic 200 are iterated until all domains are fully activated such that the original service intent 160, as an E2E service, may be established. Each domain is then responsible for maintaining its operation within the established boundary conditions.

Figure 2:
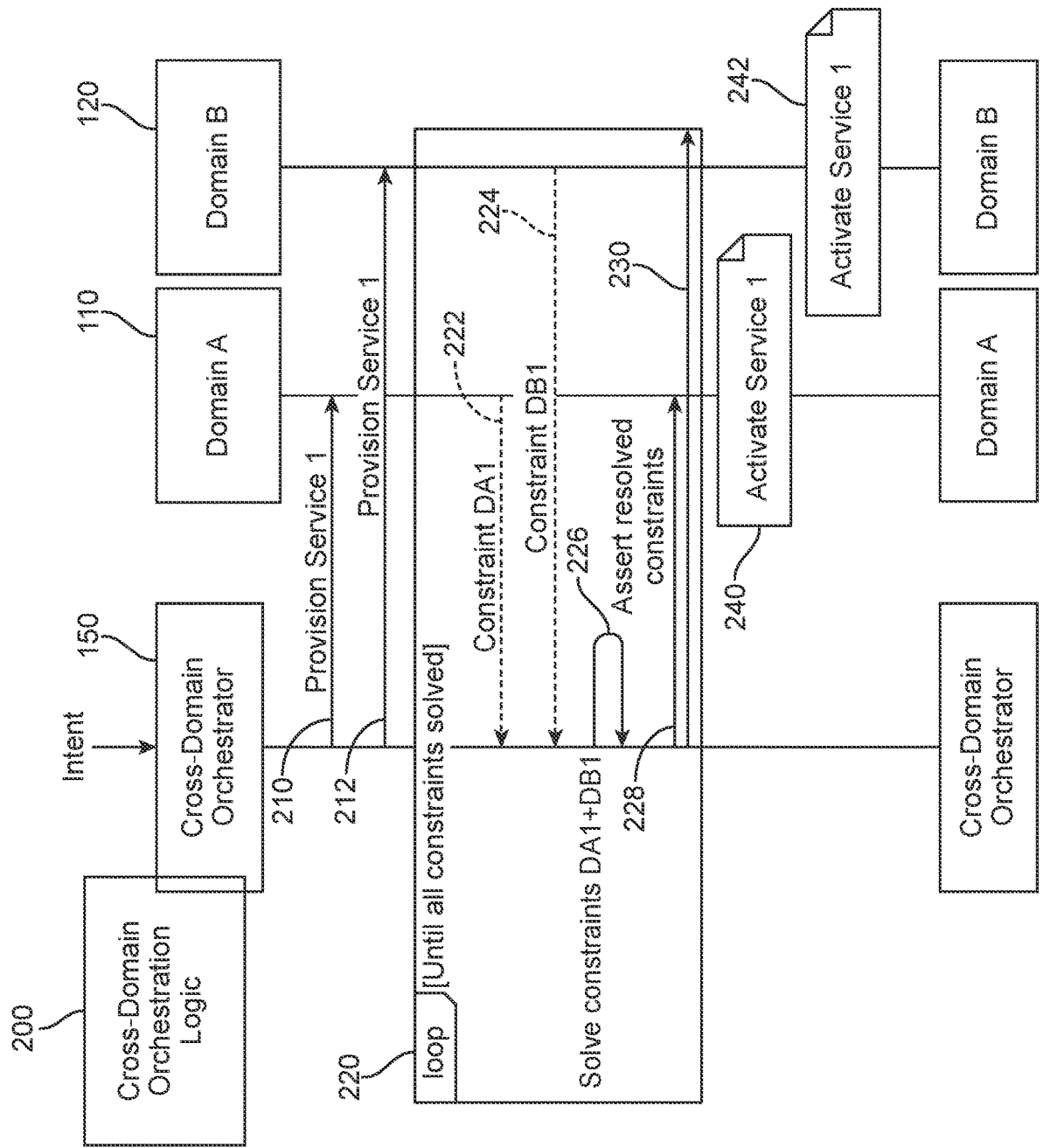
FIG. 2 is a sequence diagram showing interaction among the cross-domain orchestrator and two domains to provision an end-to-end service between the two domains, in accordance with an example embodiment.

The foregoing is illustrated by FIG. 2, which is a sequence diagram showing interaction among cross-domain orchestrator 150, and two domains (e.g., Domain A 110 and Domain B 120) to provision or establish an end-to-end service between the two domains, in accordance with an example embodiment. Those skilled in the art will appreciate that the functionality described in connection with FIG. 2 may be executed by cross-domain orchestration logic 200 and instances of domain orchestration logic 130. As shown in FIG. 2, service intent 160, or a request for service, is received at cross-domain orchestrator 150. At 210 and 212, cross-domain orchestrator 150 sends "provision service 1" commands to Domain A 110, and to Domain B 120, respectively. A loop 220 is then entered. In loop 220, at 222, Domain A 110, in response to the "provision service 1" command at 210, returns to cross-domain orchestrator 150 constraint DA1, i.e., a boundary and/or related value that may be used to establish the piece of intent sent by way of the "provision service 1" command at 210. Likewise, at 224, Domain B 120, in response to the "provision service 1" command at 212, returns to cross-domain orchestrator 150 constraint DB1, i.e., a boundary and/or related value that may be used to establish the piece of intent sent by way of the "provision service 1" command at 212. In other words, at 222 and 224, Domain A 110 and Domain B 120 assert, declare, request, accept, inform, and/or generate values associated with boundaries, individual resources, or boundary conditions associated with, or of, such resources, in response to provisioning commands or requests sent by cross-domain orchestrator 150.

At 226, cross-domain orchestrator 150 solves constraints DA1 and DB1, and at 228 and 230, cross-domain orchestrator 150 sends (e.g., asserts) to Domain A 110 and Domain B 120, the resulting resolved constraints.

Upon receiving the appropriate constraints, at 240, Domain A 110 activates its resources for Service 1, and, at 242, Domain B 120 activates its resources for Service 1.

Boundary Conditions

A boundary condition is a constraint that holds across a boundary, such as, e.g., autonomous system (AS)-numbers for External Border Gateway Protocol (eBGP), Internet Protocol (IP) addresses/subnets, radio parameters, virtual Local Area Network (VLAN) identifiers (IDs), etc.

Traditionally these values are manually selected or programmatically derived and passed to the individual domains. However, it is more optimal to allow the domains themselves to select and learn these parameters (via per domain service modeling), with cross-domain orchestrator 150 coordinating the parameter negotiation via a shared ontology.

For example, an assertion from a domain may be "The VLAN ID must be 101". In another example, a requests from a domain could be, e.g., "Give me an available VLAN for communicating with the transport domain".

Cross-domain orchestrator 150 handles such assertions and requests by gathering all of the conditions and resolving them. In this sense, cross-domain orchestrator 150 is configured to understanding the ontology and how to handle the constraints. Three main ways of handling a constraints include:
 1. Resolve existing constraints to a specific value if the constraints have a unique solution;
 2. Save a constraint and solicit the domains for more information to be able to resolve the variable to a value; and
 3. Pick a value itself—for instance a random shared secret or allocating an IP-network from a pool.

As appropriate, the ontology may include additional constraints for each type of variable. This may be especially important for the third option where extra knowledge (beyond that supplied directly by a domain) is employed for resolution.

In accordance with an embodiment, ontology mapping may be used. That is, each domain may be model-driven, and the model may map into a common ontology (a common understanding of the parameters and problems) so that cross-domain orchestrator 150 can perform the coordination without custom coding. If ontology mapping is automated then constraints can be solved automatically. The simplest way of achieving this is by ensuring that all domains share a common ontology, but in multi-vendor scenarios a mapping layer might be employed to bring the domains into a common model, or to cause a given constraint or value from one domain to be re-formatted into another form understood by another domain.

Practical Example—Provisioning Slice

A service intent 160 is passed to cross-domain orchestrator 150. In turn, cross-domain orchestrator 150 deduces that, e.g., an enhanced mobile broadband communication slice eMBB1 is to be provisioned. Consequently, each corresponding domain (e.g., Domain A 110, Domain B 120) is to be configured and optimized to support this service, with per-domain intent coordinated by cross-domain orchestrator 150, as follows:
 1. A mobile 5Gcore domain is asked to deploy dedicated containerized network functions (CNFs) to provide virtual isolation for the customer's mobile broadband functionality.
 2. A transport domain is asked to orchestrate a backhaul transport slice with QoS and forwarding path properties suitable for mobile broadband.
 3. A data center (DC) domain which hosts the mobile user-plane gateway is asked to set up an interconnect between the functionality in the private cloud DC and the transport network.
 4. A radio domain is asked to provision the radio resources.
 5. The private cloud is asked to allocate resources and start NFs as needed.

The above enumerated orchestration may proceed as follows. Those skilled in the art will appreciate that the following is greatly simplified to show only a small part of the orchestration.
 1. Each domain is given the information about MB1, and activation starts.
 2. Some domains start activation, and create new boundary conditions:
    a. The 5G-core domain returns "4 vCPUs needed in DC1."
    b. The data center domain returns "VLAN X assigned to MB1 DCL."
    c. The transport domain returns "VLAN needed for MB1 in DC1."
 3. Cross-domain orchestrator 150 redistributes the new constraints:
    a. To the private cloud to allocate 4 vCPUs in DC1
    b. The VLAN ID X is redistributed to the transport domain
 4. The domains proceed with activation and create new boundary conditions:
    a. The private cloud returns "4 vCPUs available on Cluster 1, DC1."
    b. Cross-domain orchestrator 150 redistributes the new constraint to the core domain
 5. When all constraints have been met, orchestration can finish.

Figure 3:
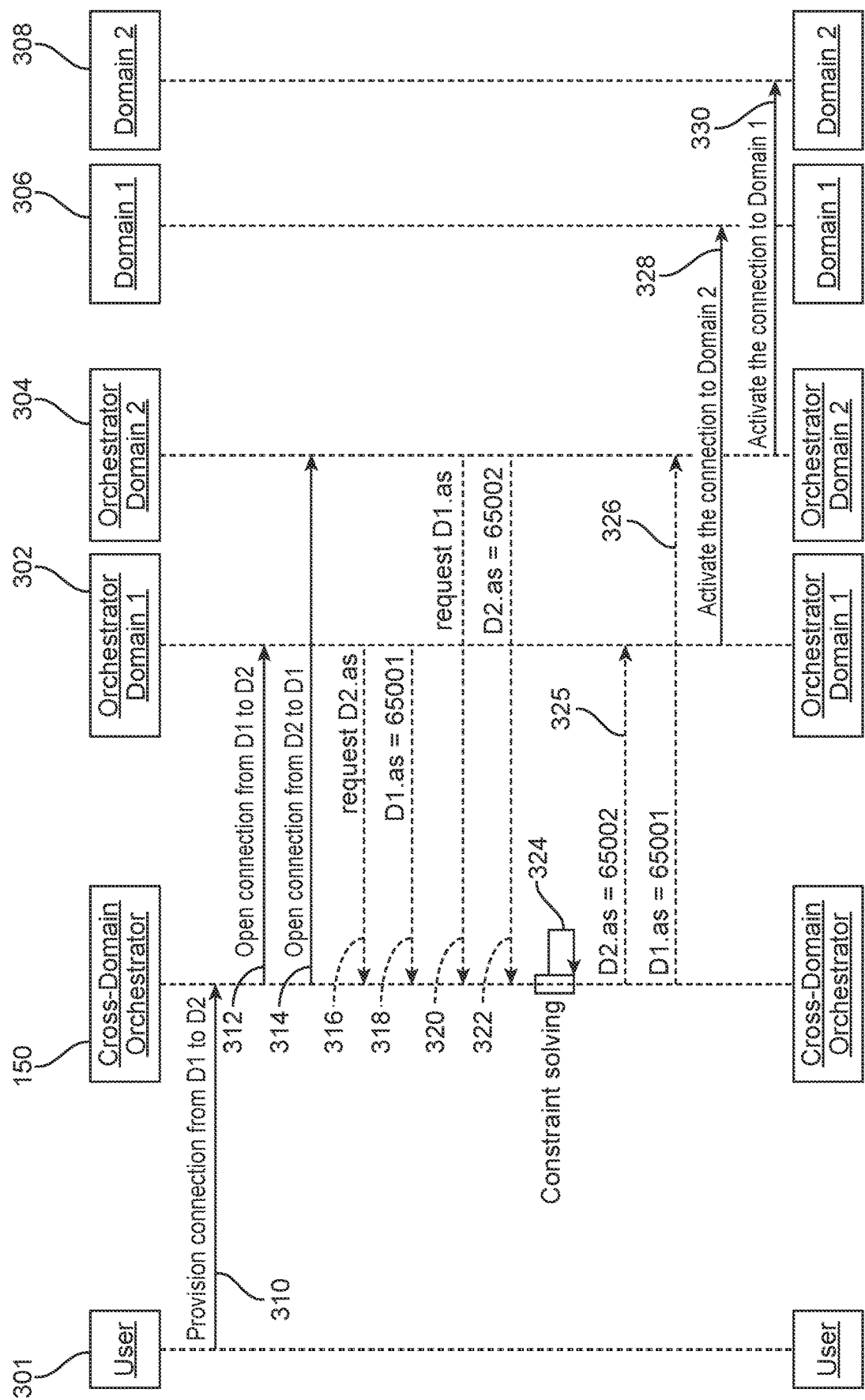
FIG. 3 is a more detailed sequence diagram showing interaction among the cross-domain orchestrator, two domains, and two domain orchestrators to provision an end-to-end service between the two domains, in accordance with an example embodiment.

FIG. 3 is a different and more detailed sequence diagram showing interaction among the cross-domain orchestrator 150, two domains, e.g., Domain A 110 and Domain B 120, and two instances of domain orchestration logic 130 to provision or establish an end-to-end service between the two domains, in accordance with an example embodiment.

More specifically, a user 301 sends, at 310, to cross-domain orchestrator 150 a service intent 160, i.e., a request to provision a connection from domain D1 to domain D2. Cross-domain orchestrator 150, at 312 and 314, sends an "open connection from D1 to D2" command to both orchestrator domain 1 302 and orchestrator domain 2 304.

At 316, orchestrator domain 1 302 sends, at 316, a "request D2.as" command to cross-domain orchestrator 150. At 318, orchestrator domain 1 302 sends a "D1.as =65001" command to cross-domain orchestrator 150. Meanwhile orchestrator domain 2 304, at 320, sends a "request D1.as" command to cross-domain orchestrator 150 and, at 322, sends a "D2.as =65002" command to cross-domain orchestrator 150. D1.as and D2.as are autonomous system numbers for respective domains.

At 324, cross-domain orchestrator 150 solves the constraints provided to it by orchestrator domain 1 302 and orchestrator domain 2 304.

Upon completing constraint solving at 324, at 325, cross-domain orchestrator 150 asserts to orchestrator domain 1 302 that "D2.as =65002" and, at 326, cross-domain orchestrator 150 asserts to orchestrator and domain 2 304 that "D1.as =65001".

With that information orchestrator domain 1 302, at 328, sends a message to domain 1 306 to activate the connection to domain 2 308. Similarly at 330, orchestrator domain 2 304, sends a message to domain 2 308 to activate the connection to domain 1 306.

In an embodiment, the constraint language used to facilitate interaction between cross-domain orchestrator 150 and lower level domains comprises sets of constraints, where each constraint contains a resource identifier and a constraint on that resource in the form of a logical condition such as equality, greater than, request, etc. Thus, examples of the constraint language include, e.g., (router1.if0.mtu>10), (request domainA.egress.vlan), (domainA.egress.vlan=100).

In an embodiment, resource identifiers have a fully qualified name and are unique within the system. They can be guaranteed unique by including the system of origin in the name, or by utilizing DNS-names, IP-addresses or other global identifiers to uniquely identify the resource.

The protocol comprises a bi-directional exchange of constraints that allows the higher-level system to receive constraints from the lower-level systems and to publish constraint solutions to the lower-level systems and ensure consistency between the independent systems.

In one embodiment, constraint solving in cross-domain orchestrator 150, may operate by combining four different methods:

Regardless of the resource, many constraints can be solved without being fully understood. For example, if there are two constraints (unknown.constraint.X<10) and (unknown.constraint X>8), resolving can still execute to can find that unknown.constraint X=9 without understanding what unknown.constraint X refers to.

If the higher-level system has domain understanding it can translate constraints into the domain languages.

For some constraints, the higher-level system may generate its own solutions. This can be possible either through domain knowledge or because a constraint has a form that anyone can satisfy, for instance imagine the constraint (linkA.password shared-secret) which may be resolved by generating a fresh shared-secret.

The higher-level system can broadcast constraints and partial solutions to the lower-level systems under the assumption that this will generate new constraints that can be solved. For example, if first domain gives off the constraints (router1.if0.type='10 GbE'), (request router2.if10.vlan) and a second domain gives off (request router1.if0.type) that may indicate that the second domain needs to know the link type before it can generate a vlan, so distributing the constraints may give rise to new information.

Thus, the operation in cross-domain orchestrator 150 may be as follows:
  A. Distribute intent
  B. (Repeated) Maintain a constraint loop that constantly goes through three steps:
    1: Gather all constraints from lower-level systems
    2: Relay or Solve as many constraints as possible
    3: Translate constraints between domains when applicable
    4: Distribute any new solutions or any translated constraints to lower-level systems Formal Model In one possible approach, the system described herein may be implemented using Network Configuration Protocol (NETCONF) and YANG. NETCONF is the standard for installing, manipulating and deleting configuration of network devices, while YANG is used to model both configuration and state data of network elements. YANG structures the data definitions into tree structures and provides many modeling features, including an extensible type system, formal separation of state and configuration data and a variety of syntactic and semantic constraints. YANG data definitions are contained in modules and provide a strong set of features for extensibility and reuse a YANG with data and notifications.

Thus, in one implementation, the following may be used as a basic model for a domain controller:

```
module: constraint
    +--rw resources
        +--rw resource* [kind name]
            +--rw kind string
            +--rw name string
            +--rw properties* [property]
                +--rw property string
                +--rw constraints* [origin id]
                |       +--rw origin string
                |       +--rw id string
                |       +--rw type enumeration
                |       +--rw assert-value? string
                +--rw value? string
notifications:
    +---n constraint-update
        +--ro kind? string
        +--ro name? string
        +--ro properties* [property]
            +--ro property string
            +--ro constraints* [origin id]
                +--ro origin string
                +--ro id string
                +--ro type enumeration
                +--ro assert-value? string
```

This is a resource/property model where each property is resolved individually and the (implicit) ontology is limited to understanding the kind field, so that each kind of constraint can be resolved correctly. In one embodiment, NETCONF notifications are used to signal new constraints from a given domain to cross-domain orchestrator 150 while cross-domain orchestrator 150 simply asserts the value of each property by configuring the domains.

For formal semantics, and in one non-limiting embodiment, a limited form of Calculus of Communicating Systems (CCS) enriched with constraints may be employed, but without choice. This is a minimal calculus limited to equality assertions and allocations.

$$P::=0|a.P1|(P1|P2)|P1[v/x]|C$$

In the above notation, a domain orchestrator P1 can take an action a, execute in parallel with another action or substitute a free variable x with v or be a cross-domain orchestrator C that handles resolution. It is possible to include multiple cross-domain orchestrators to create a hierarchical system, if the \nu operator is included (but, here, that has been omitted for clarity).

This is slightly informal to ease the notional load of the presentation. Assume that substitution, membership (\in) and congruences are defined in the usual way as needed.

Actions A may be defined using the grammar A where \tau represents an internal step:

$$A::=\tau\ \operatorname{assert}(x=v)?x$$

and labels L may be defined correspondingly as:

$$L::=\tau\!au|\ \operatorname{assert}(x=v)|\operatorname{accept}(x=v)|!x=v|?x=v$$

The cross-domain entity (e.g., cross-domain orchestrator 150) is defined in terms of stored constraints, with an implicit congruency to simplify the reduction system:

$$C::=0|C;x=v|C;\operatorname{generate}(x)$$

Assuming that x and v are drawn from a global set of identifiers and generate is a generation function capable of generating fresh values for x (such as allocating IP-addresses or ID-numbers from a pool or choosing a random password), it is possible to define the complement * on labels so that
assert(x=v)*=accept(x=v)
accept(x=v)*=assert(x=v)
!x=v*=?x=v
?x=v*=!x=v Where accept and assert are the constraint communication/resolution while ! and ?communicate values that have been resolved.

The reduction system can be given as a small-step labelled operational semantics in the style of Milner:

$$(Par1)\frac{P1--1-->P1'}{P1|P2--1-->P1'|P2}$$

$$(Par2)\frac{P2--1-->P2'}{P1|P2--1-->P1|P2'}$$

(Assert) assert(x = v).P--assert(x = v)--> P (Request) ?x.P--?x = v--> [v/x]P (Exec)\tau.P--\tau--> P $$(Accept)\frac{x\backslash notin\ C\ \lor\ x=v\backslash in\ C}{C--\operatorname{accept}(x=v)-->x=v;C}$$

$$(Inform)\frac{x=v\backslash in\ C}{C--!x=v-->C}$$

$$(Generate)\frac{v\ \operatorname{generated}}{\operatorname{generate}(x);C--\operatorname{assert}(x=v)-->x=v;C}$$

$$(Com)\frac{P1--1-->P1'\ \land\ P2--1^*-->P2'}{P1|P2--\tau-->P1'|P2'}$$

A natural expansion would be to extend A and L with additional types of assertions and expand (Accept) for more general constraint resolution. Linear constraints follow directly while constraints that require additional provisioning require term mobility so an expansion to the \pi-calculus may be needed.

Example Using the Formal Model

Two domains wish to form an eBGP session together, in which case they need to learn each other's Autonomous System Number (ASN) value to configure the eBGP neighbor relationship. Domain A 110 has ASN=65001 and Domain B 120 has ASN=65002. Cross-domain orchestrator 150 is unaware of these ASNs. Each domain has domain orchestration logic 130 that provides an abstracted and declarative service model for domain-level automation that is specific for configuring that domain's service intent. The goal here is for the domain orchestration logic 130 in Domain A 110 to assert its ASN to cross-domain orchestrator 150 such that it can be learned via a request from Domain B 120.

Assume that the initial system looks like this:
S=C|(assert(as=65001).P1)|(?as.P2)

To keep the example manageable, assume the existence of a single global AS number, a more complex system would have a more structured name and a more complicated ontology.

Operation #1: Domain orchestration logic 130 of Domain A 110 asserts its ASN to cross-domain orchestrator 150 such that an eBGP sessions can be established at the boundary:
S→(as=65001);C|P1|(?as.P2)→
[Using Assert, Accept and the Par rules]
(as=65001);C|P1|(?as.P2)
Operation #2: Domain orchestration logic 130 of Domain B 120 requests information about the AS number from cross-domain orchestrator 150:
(as=65001);C|P1|(?as.P2)→
[Using Inform, Request and Par]
(as=65001);C|P1|[65001/as]P2

These operations result in the AS number being stored in cross-domain orchestrator 150 without explicit communication between the respective instances of domain orchestration logic 130 in each of Domain A 110 and Domain B 120.

Figure 4:
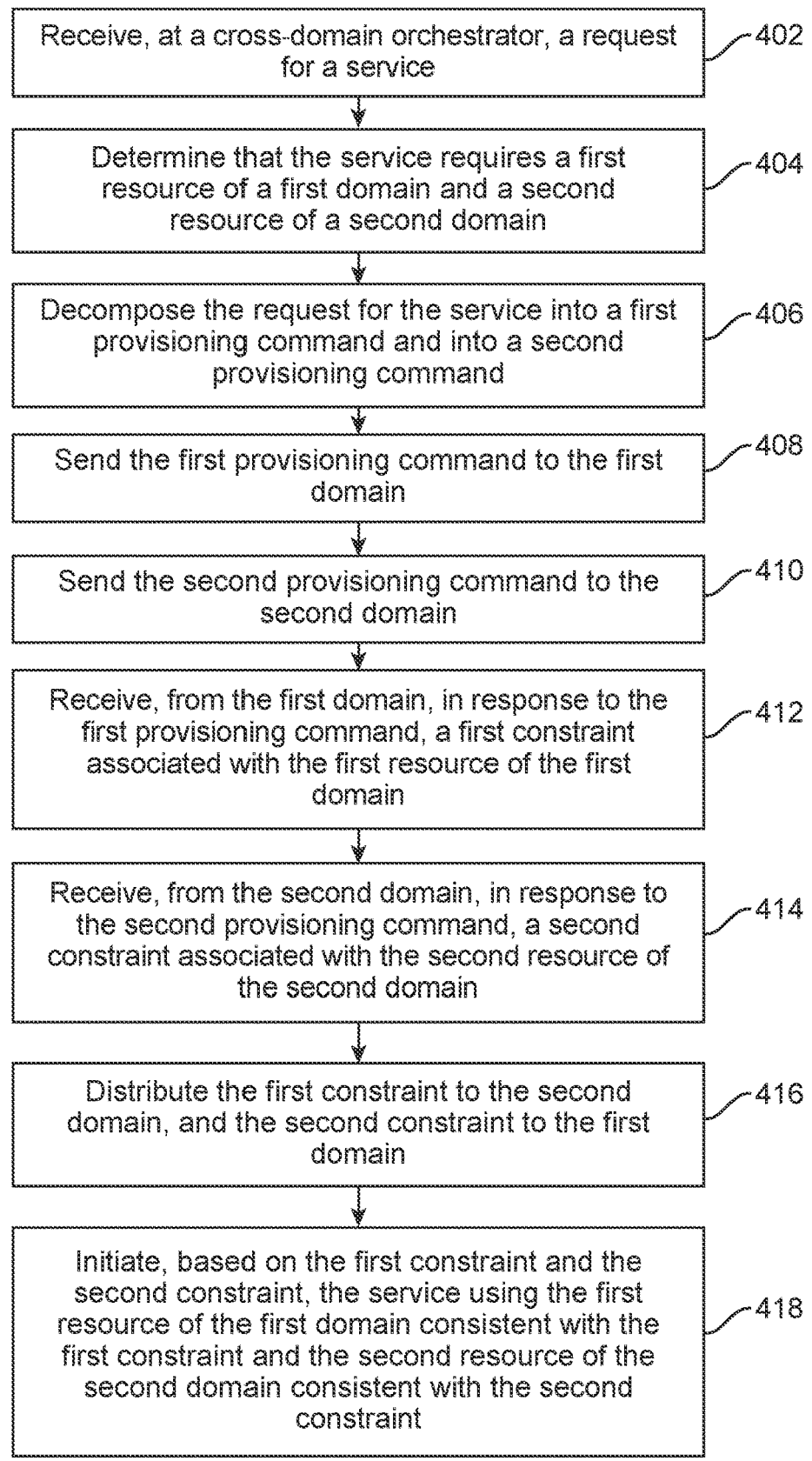
FIG. 4 is a flow chart depicting a series of operations for provisioning an end-to-end service between two domains using the cross-domain orchestrator, according to an example embodiment.

FIG. 4 is a flow chart depicting a series of operations for provisioning or establishing an end-to-end service between two domains using cross-domain orchestrator 150, according to an example embodiment. As shown, at 402, an operation is configured to receive, at a cross-domain orchestrator, a request for a service. Such a request may be in the form on an intent. At 404, an operation is configured to determine that the service requires a first resource of a first domain and a second resource of a second domain. At 406, an operation is configured to decompose the request for the service into a first provisioning command and into a second provisioning command. At 408, an operation is configured to send the first provisioning command to the first domain. At 410, an operation is configured to send the second provisioning command to the second domain. At 412, an operation is configured to receive, from the first domain, in response to the first provisioning command, a first constraint associated with the first resource of the first domain. At 414, an operation is configured to receive, from the second domain, in response to the second provisioning command, a second constraint associated with the second resource of the second domain. At 416, an operation is configured to distribute the first constraint to the second domain, and the second constraint to the first domain. And, at 418, an operation is configured to initiate, based on the first constraint and the second constraint, the service using the first resource of the first domain consistent with the first constraint and the second resource of the second domain consistent with the second constraint.

Figure 5:
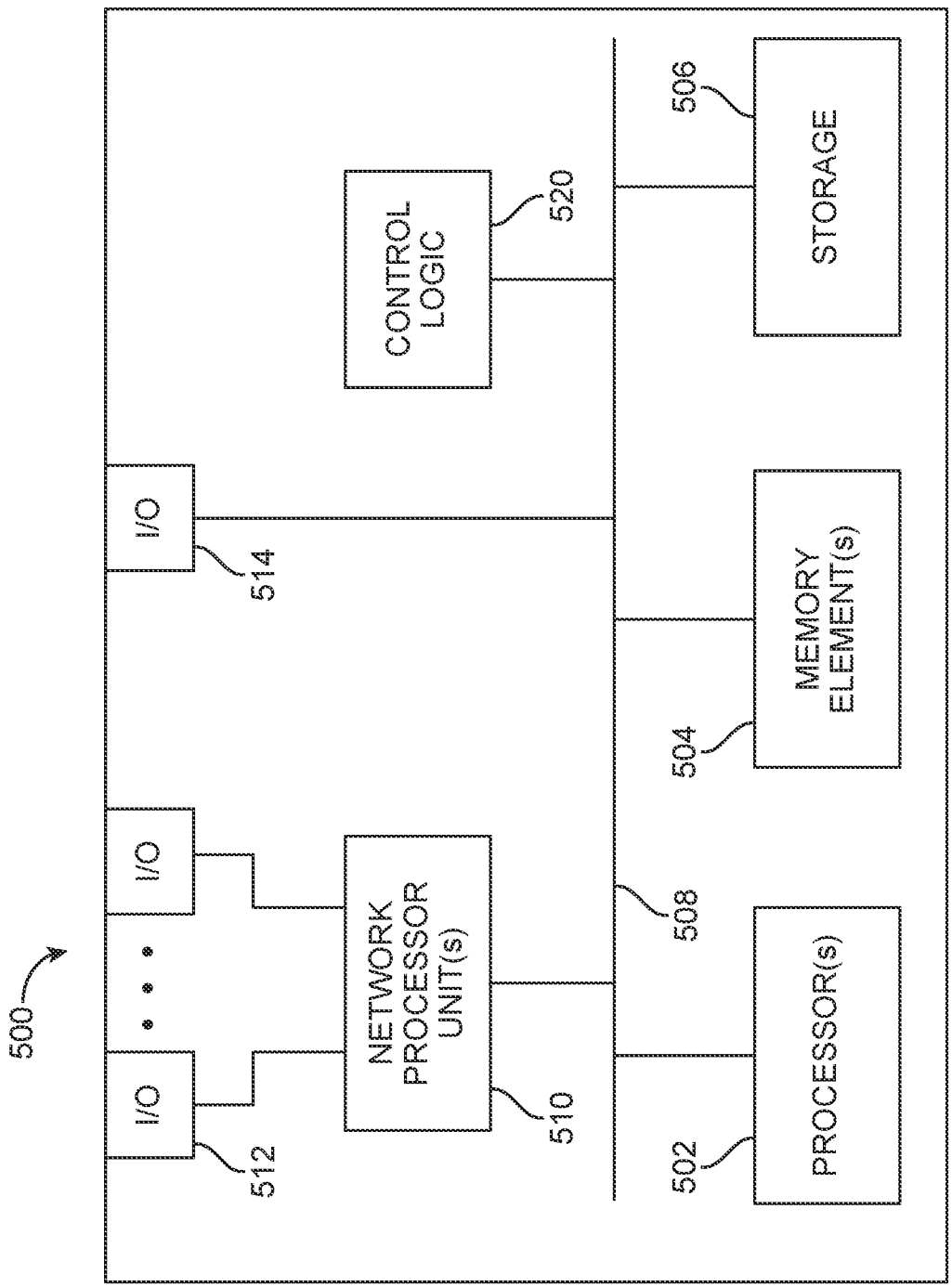
FIG. 5 is a block diagram of a device that may be configured to execute cross-domain orchestration logic, and perform the techniques described herein, according to an example embodiment.

FIG. 5 illustrates a hardware block diagram of a computing device 500 that may perform functions associated with operations discussed herein in connection with the techniques depicted in FIGS. 1-4. In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, cross-domain orchestration logic 200 or domain orchestration logic 130). In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment, a method is provided. The method may include receiving, at a cross-domain orchestrator, a request for a service, determining that the service requires a first resource of a first domain and a second resource of a second domain, decomposing the request for the service into a first provisioning command and into a second provisioning command, sending the first provisioning command to the first domain, sending the second provisioning command to the second domain, receiving, from the first domain, in response to the first provisioning command, a first constraint associated with the first resource of the first domain, receiving, from the second domain, in response to the second provisioning command, a second constraint associated with the second resource of the second domain, distributing the first constraint to the second domain, and the second constraint to the first domain, and initiating, based on the first constraint and the second constraint, the service using the first resource of the first domain consistent with the first constraint and the second resource of the second domain consistent with the second constraint.

The method may also include resolving the first constraint in view of the second constraint.

The method may further include receiving the request for the service as a service intent.

The method may include sending a third provisioning request to the first domain in response to the second constraint.

The method may still further include ontology mapping a third constraint received from the first domain to a re-formatted third constraint that is understood by the second domain, and sending the re-formatted third constraint to the second domain.

In the method, the first constraint and the second constraint may define boundary conditions of at least one of the first domain and the second domain.

In the method, at least one of the first constraint and the second constraint may include at least one of an autonomous system number, an Internet Protocol address, a subnet address, a radio parameter, or a virtual local area network identifier.

The method may also include instantiating a YANG model to keep track of the first constraint associated with the first resource of the first domain and the second constraint associated with the second resource of the second domain.

In the method at least one of the first constraint or the second constraint may include a resource identifier, a logical condition, and a value of a resource corresponding to the resource identifier.

In the method, the logical condition may include at least one of equality, greater than, less than, or query.

A device may also be provided. The device may include: an interface configured to enable network communications, a memory, and one or more processors coupled to the interface and the memory, and configured to: receive, at a cross-domain orchestrator, a request for a service, determine that the service requires a first resource of a first domain and a second resource of a second domain, decompose the request for the service into a first provisioning command and into a second provisioning command, send the first provisioning command to the first domain, send the second provisioning command to the second domain, receive, from the first domain, in response to the first provisioning command, a first constraint associated with the first resource of the first domain, receive, from the second domain, in response to the second provisioning command, a second constraint associated with the second resource of the second domain, distribute the first constraint to the second domain, and the second constraint to the first domain, and initiate, based on the first constraint and the second constraint, the service using the first resource of the first domain consistent with the first constraint and the second resource of the second domain consistent with the second constraint.

In the device, the one or more processors may be are further configured to resolve the first constraint in view of the second constraint.

In the device, the one or more processors may be further configured to receive the request for the service as a service intent.

In the device, the one or more processors may be further configured to send a third provisioning request to the first domain in response to the second constraint.

In the device, the one or more processors may be further configured to ontology map a third constraint received from the first domain to a re-formatted third constraint that is understood by the second domain, and send the re-formatted third constraint to the second domain.

In the device, the first constraint and the second constraint may define boundary conditions of at least one of the first domain and the second domain.

In the device, at least one of the first constraint and the second constraint may include at least one of an a autonomous system number, an Internet Protocol address, a subnet address, a radio parameter, or a virtual local area network identifier.

In still another embodiment, a non-transitory tangible computer readable storage media is provided and is encoded with instructions that, when executed by at least one processor, is configured to cause the at least one processor to: receive, at a cross-domain orchestrator, a request for a service, determine that the service requires a first resource of a first domain and a second resource of a second domain, decompose the request for the service into a first provisioning command and into a second provisioning command, send the first provisioning command to the first domain, send the second provisioning command to the second domain, receive, from the first domain, in response to the first provisioning command, a first constraint associated with the first resource of the first domain, receive, from the second domain, in response to the second provisioning command, a second constraint associated with the second resource of the second domain, distribute the first constraint to the second domain, and the second constraint to the first domain, and initiate, based on the first constraint and the second constraint, the service using the first resource of the first domain consistent with the first constraint and second resource of the second domain consistent with the second constraint.

In an implementation, the non-transitory tangible computer readable storage media further includes instructions to cause the at least one processor to: resolve the first constraint in view of the second constraint.

In an implementation, the non-transitory tangible computer readable storage media further includes instructions to cause the at least one processor to: receive the request for the service as a service intent.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   receiving, at a cross-domain orchestrator, a request for a service;
   determining that the service requires a first resource of a first domain and a second resource of a second domain;
   decomposing the request for the service into a first provisioning command and into a second provisioning command;
   sending the first provisioning command to the first domain;
   sending the second provisioning command to the second domain;
   receiving, from the first domain, in response to the first provisioning command, a first constraint associated with the first resource of the first domain;
   receiving, from the second domain, in response to the second provisioning command, a second constraint associated with the second resource of the second domain;
   distributing the first constraint to the second domain, and the second constraint to the first domain; and
   initiating, based on the first constraint and the second constraint, the service using the first resource of the first domain consistent with the first constraint and the second resource of the second domain consistent with the second constraint.

2. The method of claim 1, further comprising resolving the first constraint in view of the second constraint.

3. The method of claim 1, further comprising receiving the request for the service as a service intent.

4. The method of claim 1, further comprising, sending a third provisioning request to the first domain in response to the second constraint.

5. The method of claim 1, further comprising ontology mapping a third constraint received from the first domain to a re-formatted third constraint that is understood by the second domain, and sending the re-formatted third constraint to the second domain.

6. The method of claim 1, wherein the first constraint and the second constraint define boundary conditions of at least one of the first domain and the second domain.

7. The method of claim 6, wherein at least one of the first constraint and the second constraint comprises at least one of an autonomous system number, an Internet Protocol address, a subnet address, a radio parameter, or a virtual local area network identifier.

8. The method of claim 1, further comprising instantiating a YANG model to keep track of the first constraint associated with the first resource of the first domain and the second constraint associated with the second resource of the second domain.

9. The method of claim 8, wherein at least one of the first constraint or the second constraint comprises a resource identifier, a logical condition, and a value of a resource corresponding to the resource identifier.

10. The method of claim 9, wherein the logical condition comprises at least one of equality, greater than, less than, or query.

11. A device comprising:
   an interface configured to enable network communications;
   a memory; and
   one or more processors coupled to the interface and the memory, and configured to:
      receive, at a cross-domain orchestrator, a request for a service;
      determine that the service requires a first resource of a first domain and a second resource of a second domain;
      decompose the request for the service into a first provisioning command and into a second provisioning command;
      send the first provisioning command to the first domain;
      send the second provisioning command to the second domain;
      receive, from the first domain, in response to the first provisioning command, a first constraint associated with the first resource of the first domain;
      receive, from the second domain, in response to the second provisioning command, a second constraint associated with the second resource of the second domain;
      distribute the first constraint to the second domain, and the second constraint to the first domain; and
      initiate, based on the first constraint and the second constraint, the service using the first resource of the first domain consistent with the first constraint and the second resource of the second domain consistent with the second constraint.

12. The device of claim 11, wherein the one or more processors are further configured to resolve the first constraint in view of the second constraint.

13. The device of claim 11, wherein the one or more processors are further configured to receive the request for the service as a service intent.

14. The device of claim 11, wherein the one or more processors are further configured to send a third provisioning request to the first domain in response to the second constraint.

15. The device of claim 11, wherein the one or more processors are further configured to ontology map a third constraint received from the first domain to a re-formatted third constraint that is understood by the second domain, and send the re-formatted third constraint to the second domain.

16. The device of claim 11, wherein the first constraint and the second constraint define boundary conditions of at least one of the first domain and the second domain.

17. The device of claim 16, wherein at least one of the first constraint and the second constraint comprises at least one of an a autonomous system number, an Internet Protocol address, a subnet address, a radio parameter, or a virtual local area network identifier.

18. A non-transitory tangible computer readable storage media encoded with instructions that, when executed by at least one processor, is configured to cause the at least one processor to:
  receive, at a cross-domain orchestrator, a request for a service;
  determine that the service requires a first resource of a first domain and a second resource of a second domain;
  decompose the request for the service into a first provisioning command and into a second provisioning command;
  send the first provisioning command to the first domain;
  send the second provisioning command to the second domain;
  receive, from the first domain, in response to the first provisioning command, a first constraint associated with the first resource of the first domain;
  receive, from the second domain, in response to the second provisioning command, a second constraint associated with the second resource of the second domain;
  distribute the first constraint to the second domain, and the second constraint to the first domain; and
  initiate, based on the first constraint and the second constraint, the service using the first resource of the first domain consistent with the first constraint and the second resource of the second domain consistent with the second constraint.

19. The non-transitory tangible computer readable storage media of claim 18, further comprising instructions to cause the at least one processor to: resolve the first constraint in view of the second constraint.

20. The non-transitory tangible computer readable storage media of claim 18, further comprising instructions to cause the at least one processor to: receive the request for the service as a service intent.

* * * * *